Inventor,
J. A. Aiton
By: Glascock Downing & Seebold
Attys.

Patented July 20, 1943

2,324,663

UNITED STATES PATENT OFFICE 2,324,663

APPARATUS FOR DISTILLING LIQUIDS

John Arthur Aiton, Derby, England, assignor to Aiton & Company Limited, Derby, England Application March 12, 1941, Serial No. 382,992
In Great Britain March 30, 1940

7 Claims. (Cl. 202—180)

This invention relates to apparatus primarily intended for distilling raw water such as sea-water for the purpose of providing pure boiler feed water and/or drinking water, but it will be understood that the invention is capable of more general application to liquids.

The invention has particular reference to apparatus of the kind in which the liquid is heated and flashed into vapour by a pressure reduction, the vapour being passed to a preheater condenser in which it is condensed to give a pure distillate.

It is found that with such apparatus there is a tendency for impurities to be carried over to the condenser with the vapour either in the form of particles or as liquid droplets, with the result that the degree of purity of the distillate is correspondingly lowered.

The object of the present invention is to obviate this defect of existing apparatus and to obtain a high degree of purity in the distillate with a minimum expenditure of heat energy.

The invention consists in distilling apparatus of the kind referred to in which the flashing of the liquid into vapour takes place under the influence of centrifugal action whereby the vapour is separated from any impurities that might otherwise be carried over with it.

The invention also consists in distilling apparatus of the kind referred to comprising a preheater condenser in which the distillate is condensed and raw liquid preliminarily heated, a heater in which the raw liquid is finally heated, and an intermediate vapour chamber to which the heated liquid is admitted with a whirling motion and in which the pressure is simultaneously reduced to cause flashing of a portion of the liquid to vapour which is then passed to the preheater condenser.

The invention further consists in the provision of automatic control for the plant and other details and arrangements hereinafter described or indicated.

The accompanying drawings illustrate one convenient mode of carrying out the invention.

Figure 1:
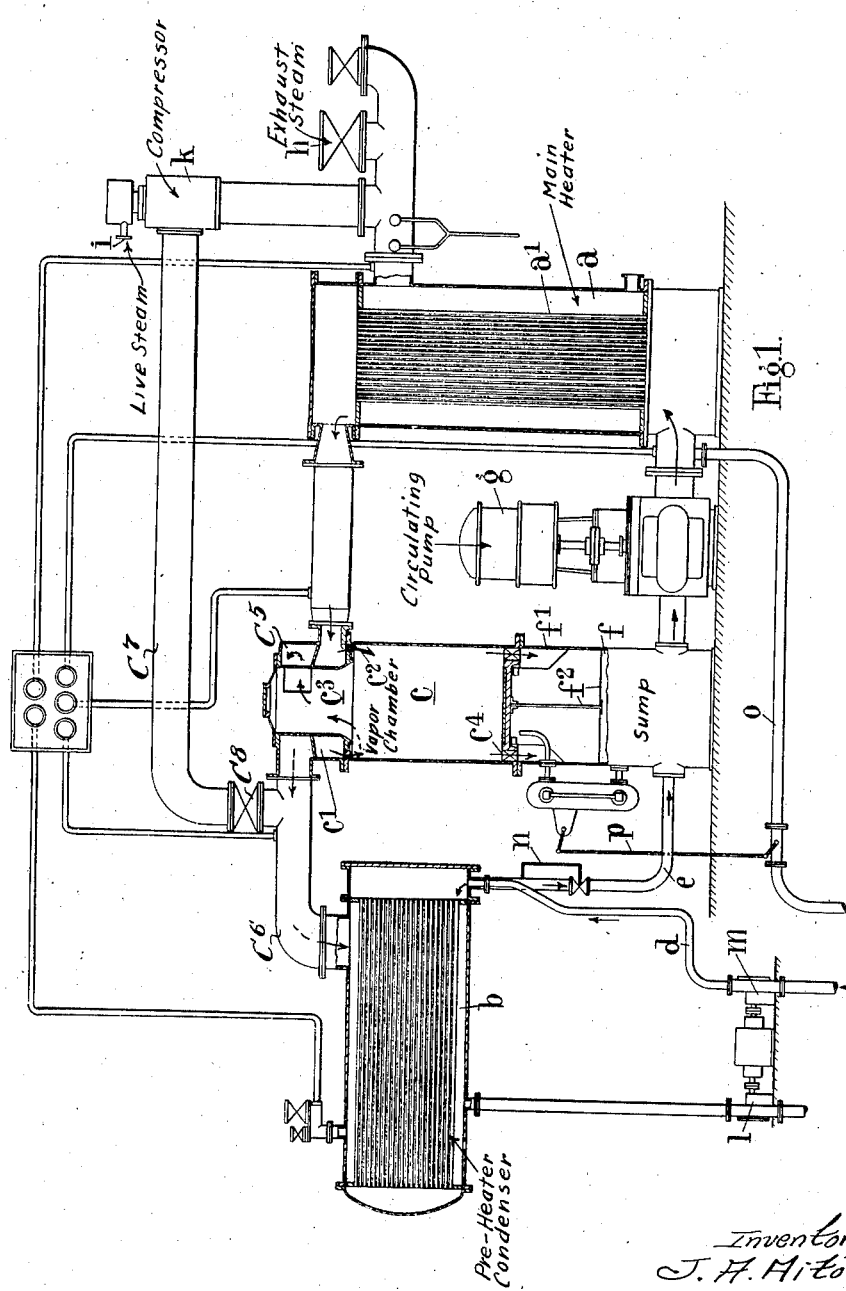
Figure 1 is a diagram showing the general layout of one form of apparatus in accordance with the invention.
Figure 2:
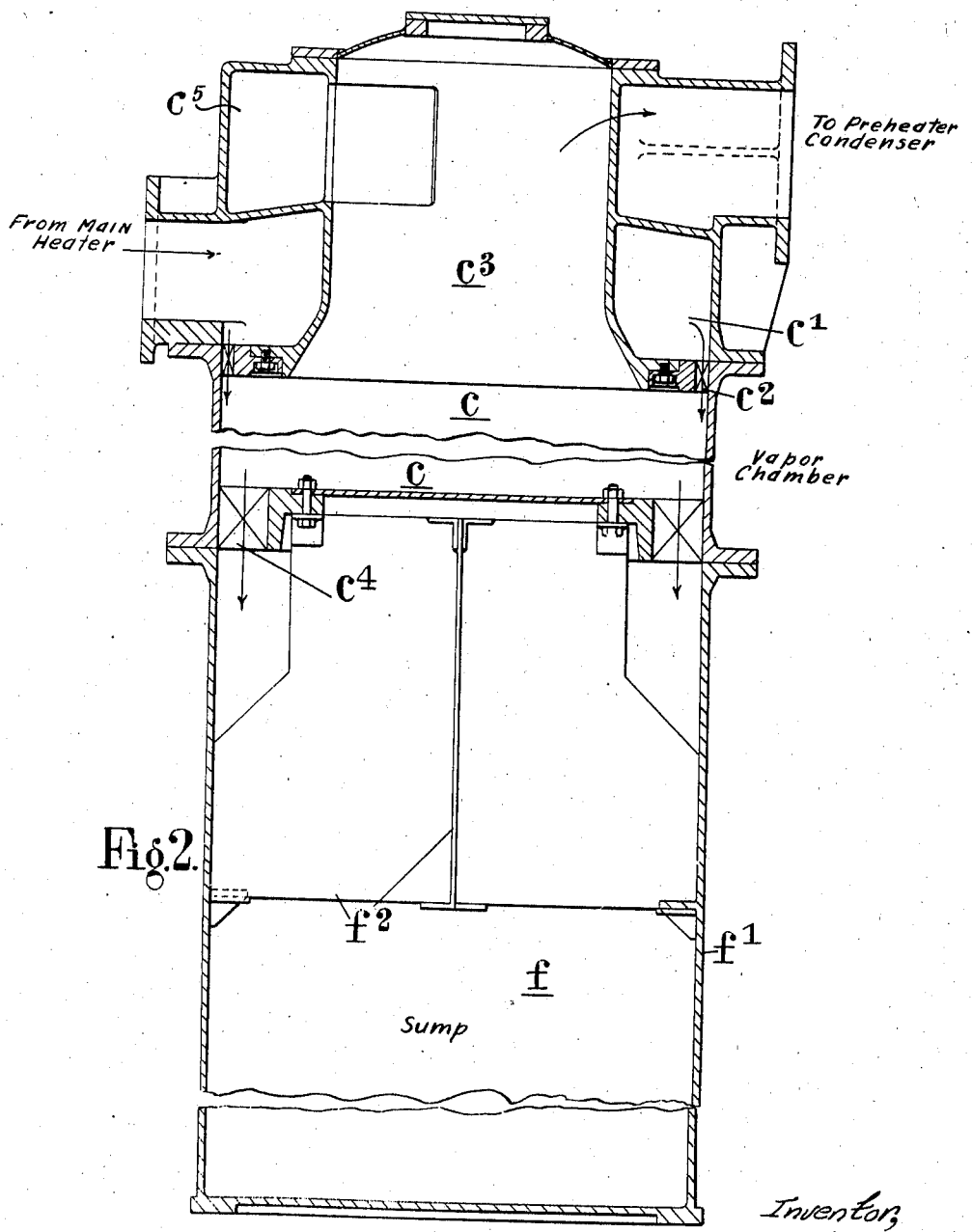
Figure 2 is a view on a larger scale of a part shown in Figure 1.
Figure 3:
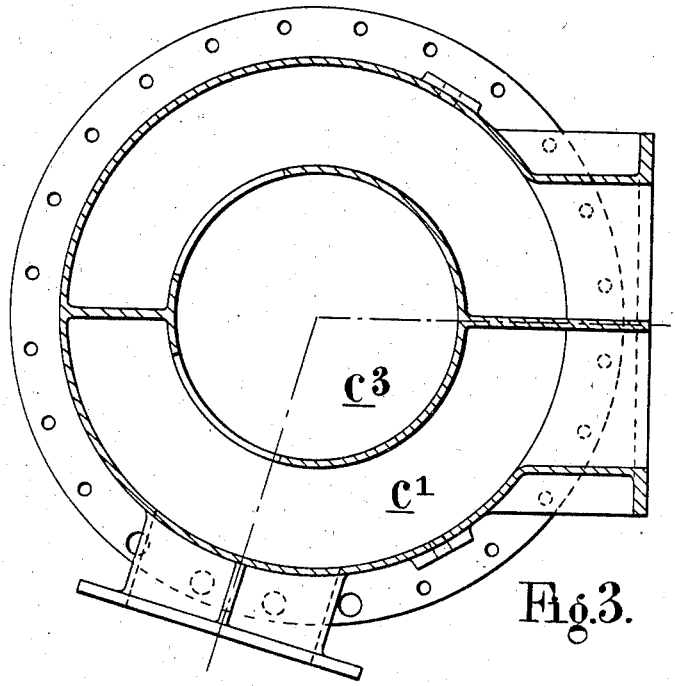
Figures 3 and 4 are two cross-sectional views of Figure 2.
Figure 4:
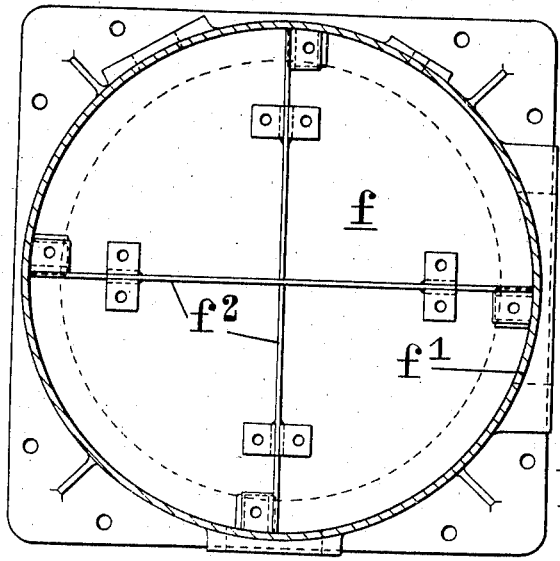

In carrying my invention into effect in one convenient manner as, for example, in its application to the distillation of sea-water, I provide a heating chamber $a$ in which the final heating of the sea-water takes place, a preheater condenser $b$ in which the sea-water is preliminarily heated and the distilled vapour condensed, and an intermediate vapour chamber $c$ having suitable connections to the heater and preheater condenser.

In one convenient construction the heating chamber $a$ may be vertically disposed and comprises a number of tubes $a'$ through which the sea-water passes to be heated by steam admitted to the space surrounding the tubes and the preheater condenser $b$ may be of similar construction but arranged horizontally. Sea-water is led by the pipe $d$ into the preheater condenser through which it passes in a sinuous path and from which it emerges through an exit pipe $e$ leading to a sump $f$ beneath the vapour chamber, from which sump it is then withdrawn by the circulating pump $g$ to be passed through the heating chamber $a$. The sea-water, after being heated in the heating chamber, is led to an annular chamber $c'$ in the vapour chamber head in which annular chamber are a series of inlet nozzles $c^2$ directing the water tangentially on to the sides of the vapoud chamber $c$. In passing through the nozzles the pressure of the water falls and flashing takes place and the whirling motion induced by the nozzles separates any particles from the vapour which is led through a central branch $c^3$ of the vapour chamber head (surrounded by the annular chamber $c'$ in which the aforesaid nozzles $c^2$ are located) to the preheater condenser $b$ where it is condensed and gives up heat to the sea-water circulating therethrough. The vapour passes from the central branch $c^3$ into the annular chamber $c^5$ and flows from the latter along the pipe $c^6$ to the preheater condenser $b$. That part of the heated sea-water which is not flashed into vapour is led through outlet nozzles $c^4$ in the lower part of the vapour chamber and falls into the sump $f$ below the vapour chamber where it is mixed with the sea-water feed and circulation through the heating chamber is repeated.

The upper part of the support tube $f'$ for the vapour chamber constituting the sump $f$ is provided with any cruciform or other arrangement of baffles $f^2$ to induce a state of quiescence in the liquid contained in the sump.

The apparatus may be arranged for operation by the use of exhaust steam admitted at $h$, in which case the whole of the vapour produced is condensed in the preheater condenser, or I may employ vapour compression operation, in which case a small supply of live steam is admitted at $i$ and is expanded in the compressor $k$ (which may be a thermo- or mechanical-compressor) thus aspirating part of the vapour produced in the vapour chamber and delivered to the pipe $c^6$ and compressing it to such a degree that when the mixture is discharged into the heating chamber its temperature is raised to give the temperature difference required for evaporation. The pipe $c^5$ is in communication with the compressor via the pipe $c^7$, in which the control valve $c^8$ is provided. The remainder of the vapour from the vapour chamber passes to the preheater condenser to be condensed and the discharge from the latter is led to the fresh water pump $l$ and discharged to the fresh water tanks or the hotwell or otherwise disposed of. The sea-water pump is shown at $m$.

It is preferred that when once the plant has attained running conditions its control shall be automatic so that no manipulation of valves may be required. Any variation in the heating steam pressure will alter proportionally the output of vapour from the vapour chamber and this will either reduce or increase the flow of vapour to the preheater with the result that the temperature of the sea-water emerging from the preheater will vary unless the flow of water is controlled to give a constant temperature at exit. The first control provided consists of a thermostatically controlled valve $n$ which controls the flow of sea-water through the preheater so that the temperature of the water at exit varies between 200° and 203° F. The whole of the water passing through the preheater is led to the sump below the vapour chamber. Should, however, the quantity of water passing into the plant be greatly in excess of that required, part of this water can be by-passed overboard before entering sump $f$. The normal density to which the density is maintained within these limits is 17° on the Admiralty scale or 1.7/32.

The advantage of keeping the temperature of the sea-water stable at the outlet from the preheater is its effect on the pressure of the vapour which is being condensed. By thus stabilising the outlet temperature of the sea-water the pressure of the vapour in the preheater does not vary appreciably and under usual conditions of working is about atmospheric. The stable pressure in the preheater means a stable pressure in the vapour chamber which is essential to the correct working of the apparatus, as any variation of pressure on the water surface, which is at the same time flashing vapour, would tend to commence priming, and contamination of the distillate might result.

With the apparatus above described the quantity of sea-water entering the plant depends upon the thermostatic control above referred to. It is, however, necessary to maintain a constant head of water on the suction side of the circulating pump $g$ and this may be effected by taking the blow-down connection $o$ from the discharge side of the circulating pump and controlling the blow-down valve by the linkage $p$ actuated by a float controlled by the level of water within the sump, which level should not vary by more than ±1½ inches.

The discharge head on the pump, which consists of the friction head in the tubes of the heating chamber and the pressure drop through the inlet nozzles in the vapour chamber, is sufficient to eject the blow-down overboard without the use of a brine pump.

It is preferable to provide the sea-water inlet $d$ and the blow-down $o$ with manual controls so that the plant may be controlled manually in the event of either or both of the automatic controls being out of action.

It will be understood that the foregoing details of construction are given by way of example only to indicate the nature of the invention, as is also the particular application, and I may vary the construction and arrangement of my heater, preheater and vapour chamber and the means for connecting the various parts of the apparatus, depending upon the purpose for which it is to be employed or any practical requirements that may have to be fulfilled.

I claim:

1. Distilling apparatus of the kind referred to comprising in combination, a preheater condenser in which the distillate is condensed and raw liquid preliminarily heated, a main heater in which the raw liquid is finally heated, an intermediate vapour chamber to which the liquid passes from the said heater, nozzles in said intermediate vapour chamber for directing the liquid tangentially on to the sides of the chamber and to cause flashing of the liquid to vapour, a sump at the bottom of the vapour chamber and outlet nozzles in the bottom of the latter through which that portion of the liquid which is not flashed into vapour passes to the sump, the latter being connected both with the preheater condenser and the said main heater so that the liquid delivered from the preheater condenser can be passed to the sump for delivery therefrom to the main heater and the liquid discharged into the sump from the vapour chamber recirculated through the main heater, and means whereby the feed can be passed from the condenser to the sump and the residue dumped and the vapour passed to the condenser.

2. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated, and a vapour chamber connected between the preheater condenser and the main heater and having an inlet for the liquid delivered from the main heater which inlet is formed to direct the liquid tangentially against the inside walls of the vapour chamber and cause flashing of the liquid to vapour, a sump at the bottom of the vapour chamber and nozzles in the bottom of the latter arranged to discharge that portion of the liquid not flashed into vapour vertically downwards into the sump so that the liquid is maintained therein in a state of quiescence, the sump being connected both with the preheater condenser and the said main heater so that the liquid delivered from the preheater condenser can be passed to the sump for delivery therefrom to the main heater and the liquid discharged into the sump from the vapour chamber recirculated through the main heater.

3. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated, a vapour chamber connected between the preheater condenser and the heater to receive the liquid from the main heater, the said vapour chamber being formed with an upper chamber in which the liquid is received from the main heater and with a lower chamber in which vaporisation of the liquid takes place, nozzle means connecting the said two chambers so that the liquid is directed tangentially against the inside walls of the vapour chamber, a sump at the bottom of the latter and nozzle means connecting the sump and the vapour chamber so that the liquid not vaporised flows into the sump while travelling vertically downwards, the sump being connected both with the preheater condenser and the said main heater so that the liquid delivered from the preheater condenser can be passed to the sump for delivery therefrom to the main heater and the liquid discharged into the sump from the vapour chamber recirculated through the main heater.

4. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated, and an intermediate vapour chamber to which the liquid passes from the main heater, nozzles in said intermediate vapour chamber for directing the liquid tangentially on to the sides of the chamber and to cause flashing of the liquid to vapour, a sump at the bottom of the vapour chamber, outlet nozzles in the bottom of the latter through which that portion of the liquid which is not flashed into vapour passes to the sump, and baffle means in said sump arranged to induce a state of quiescence in the liquid in the sump, the latter being connected both with the preheater condenser and the said main heater so that the liquid delivered from the preheater condenser can be passed to the sump for delivery therefrom to the main heater and the liquid discharged into the sump from the vapour chamber recirculated through the main heater, and pipe means connecting the vapour chamber and the condenser to permit vapour to pass from the vapour chamber to the condenser.

5. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated, and a vapour chamber connected between the preheater condenser and the main heater and having an inlet for the liquid delivered from the main heater which inlet is formed to direct the liquid tangentially against the inside walls of the vapour chamber and cause flashing of the liquid to vapour, a sump at the bottom of the vapour chamber, nozzles in the bottom of the latter arranged to discharge that portion of the liquid not flashed into vapour vertically downwards into the sump so that the liquid is maintained therein in a state of quiescence, and baffle means in said sump arranged to induce a state of quiescence in the liquid in the sump, the latter being connected both with the preheater condenser and the said main heater so that the liquid delivered from the preheater condenser can be passed to the sump for delivery therefrom to the main heater and the liquid discharged into the sump from the vapour chamber recirculated through the main heater.

6. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated, a vapour chamber connected between the preheater condenser and the main heater to receive the liquid from the latter, the said vapour chamber being formed with an upper chamber in which the liquid is received from the main heater and with a lower chamber in which vaporisation of the liquid takes place, nozzle means connecting the said two chambers so that the liquid is directed tangentially against the inside walls of the vapour chamber, a sump at the bottom of the latter, nozzle means connecting the sump and the vapour chamber so that the liquid not vaporized flows into the sump while travelling vertically downwards, and baffle means in said sump arranged to induce a state of quiescence in the liquid in the sump, the latter being connected both with the preheater condenser and the said main heater so that the liquid delivered from the preheater condenser can be passed to the sump for delivery therefrom to the main heater and the liquid discharged into the sump from the vapour chamber recirculated through the main heater.

7. Distilling apparatus of the kind referred to comprising in combination, a preheater condenser in which the distillate is condensed and raw liquid preliminarily heated, a feed inlet to the condenser for the distillate and an outlet therefrom for the residue, a main heater in which the raw liquid is finally heated and an intermediate vapour chamber to which the liquid is passed from the main heater, a sump at the bottom of the vapour chamber into which that portion of the liquid not vaporized is discharged from the vapour chamber, nozzle means in the upper part of the vapour chamber through which the liquid from the preheater condenser is passed to the vapour chamber to cause flashing of the liquid in said chamber, nozzle means at the bottom of the vapour chamber through which the remaining liquid therein is passed to the sump, a pump for circulating the liquid through the sump and the heater and having a blow-down connection from the discharge side of the pump, a valve for regulating the blow-down, a float in the vapour chamber automatically controlling the said valve and means for maintaining a substantially contant head of liquid on the suction side of the pump, the said sump being connected both with the preheater condenser and the said main heater so that the liquid delivered from the preheater condenser can be passed to the sump for delivery therefrom to the main heater and the liquid discharged into the sump from the vapour chamber recirculated through the main heater, and pipe means connecting the vapour chamber and the condenser to permit vapour to pass from the vapour chamber to the condenser.

J. ARTHUR AITON.